J. P. OLDROYD.
IMPLEMENT OR DEVICE FOR USE IN GARDENING OPERATIONS.
APPLICATION FILED SEPT. 28, 1917.
1,266,523.
Patented May 14, 1918.
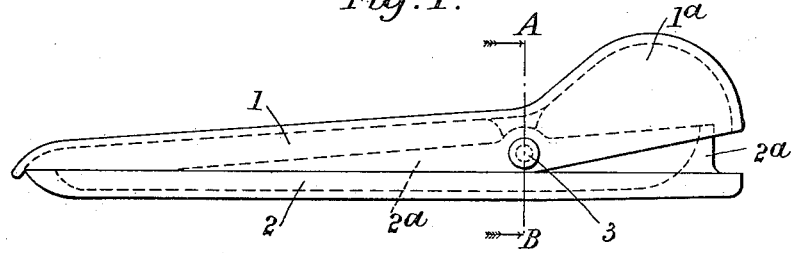
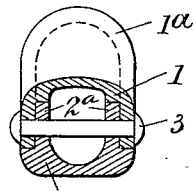
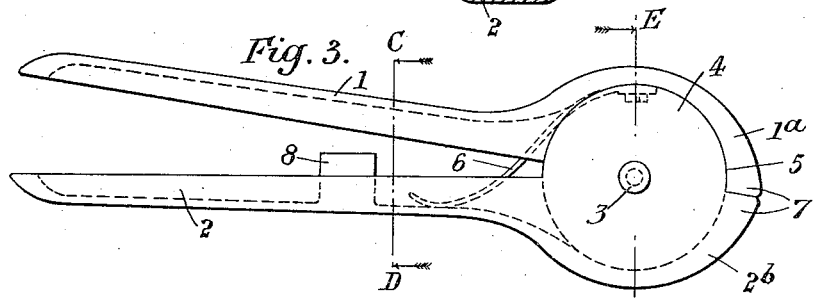
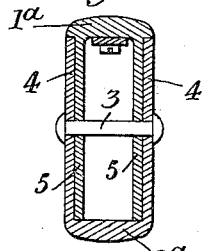
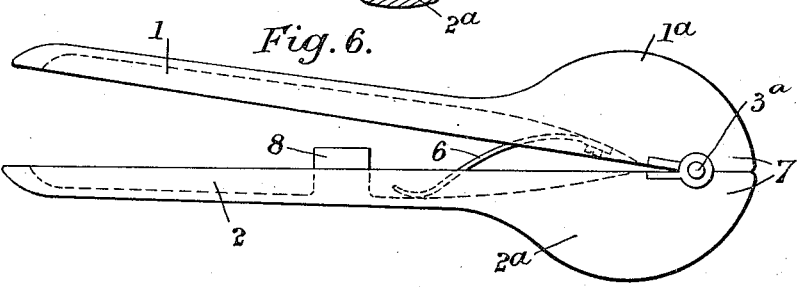
INVENTOR
JOHN PHILLIPS OLDROYD
BY Horton and Horton
ATTORNEYS

UNITED STATES PATENT OFFICE.

JOHN PHILLIPS OLDROYD, OF EALING, ENGLAND.

IMPLEMENT OR DEVICE FOR USE IN GARDENING OPERATIONS.

1,266,523.   Specification of Letters Patent.   Patented May 14, 1918.

Application filed September 28, 1917. Serial No. 193,713.

*To all whom it may concern:*

Be it known that I, JOHN PHILLIPS OLDROYD, a subject of the King of Great Britain, residing at 1 King's Avenue, Ealing, in the county of Middlesex, England, have invented new and useful Improvements in Implements or Devices for Use in Gardening Operations, of which the following is a specification.

This invention has for its object to provide a very simple and efficient implement, or device, for use in gardening operations, by means of which objectionable matter, such, for instance, as weeds, stones, refuse, slugs, and the like, can be removed and where necessary, crushed, or destroyed, the said implement, or device, being of the kind having parts which will open out and can be closed with the object of grasping the matter to be removed, the object of my invention being to provide a very simple and efficient implement, or device, which can be very easily manipulated by one hand and which will readily and firmly grasp the object the joint between the parts being so disposed as not to be liable to become clogged, or injured, by earth, or dirt, while the connection at such joint can be made very strong and firm laterally.

The device in accordance with my invention consists of, or comprises, two parts hinged together at, or toward, their bases and formed, so that they will, when brought together, readily seize and hold, or destroy, the said matter and, when necessary, penetrate the soil for the purpose. I shape one part of the device like the lower bill, and the other part like the upper bill, of a duck, or other bird, whose bill has a form suitable for penetrating the ground the end of the upper part, if so desired, somewhat overlapping the end of the lower part, the said parts being hollow, or trough-shaped, inside, and the edges meeting and being shaped as may be desired to afford a good grip upon an object. The said two parts, or one of them at, or toward, the base are, or is, somewhat enlarged to give a good hold for the hand of the user, and this enlargement may be likened to a bird's head, and be referred to as the head. If desired the parts may be provided with any suitable means for guiding them to insure the two parts properly meeting, or grasping the object to be removed, for example, one part may be provided, on its inside, with a projecting, or pressed up, part which may be curved, or inclined, and will act as a guide for the other part by entering it when the two parts are pressed together. A spring may be employed to normally open the device when the parts are not operated. The two parts may be hinged together by any suitable means which will give sufficient sidewise support and allow of their opening out under the action of the spring when that is employed, and of their being closed by the hand of the user, and, if desired, there may be a stop to limit the movement apart of the two portions.

The accompanying drawing illustrates implements made in accordance with my invention, Figure 1 is a side view of one construction and Fig. 2 is a transverse section on the line A, B, Fig. 1, looking in the direction of the arrows, Fig. 3 is a side view of a modification and Figs. 4 and 5 are sections respectively taken on the lines C, D, and E, F, Fig. 3, looking in the direction of the arrows. Fig. 6 is a side view of another modification.

In all the forms, or constructions, shown the two main parts which are hinged together, or similarly connected so that they can turn upon each other, are marked 1 and 2 respectively, the hinge, or pin, upon which they turn being marked 3. In the construction Figs. 1 and 2, parts are shown extending beyond the hinge-joint and one part is formed of a bulged hollow form at 1$^a$, constituting the aforesaid head and the other part is formed with flanges 2$^a$, which extend some little distance along the said part 2, on the other, or blade, side of the hinge-pin 3, the said flanges entering the part 1, and acting as guides to retain the blades in proper relative position. The forward end of the part 1 is shown as somewhat overlapping the end of the part 2. The bulged, or head part 1$^a$, affords a convenient portion for the hand of the user when forcing the blades into the ground when they are closed together by pressure applied on the blade side of the hinge.

In the modification shown in Figs. 3, 4 and 5 the parts each have a bulged, or head. portion (1$^a$ and 2$^b$) and one portion is made with a semicircular projection on each side at 4, each of which engages with a similarly shaped recess 5, in the corresponding part of the other portion this giving a very firm and strong joint not liable to twist sidewise, while, in common with the other modifications shown, it is situated at the end grasped by the hand of the user and so is not liable to become clogged by earth, or dirt. A spring 6, presses the parts to the position in which the blades are open as illustrated, the shoulders at 7, acting as stops. The rounded projecting part at 8, is to guide and support the blades when they are closed upon each other. The rounded parts at 4 and 5, give a very firm and strong bearing which takes thrust off the hinge pin 3. The modification shown in Fig. 6, resembles the form shown in Figs. 3, 4 and 5 except that the rounded parts 4 and 5 and hinge pin 3, are replaced by an ordinary hinge 3ª.

The implement may be made of any suitable material, for instance, of wood, or of sheet metal, or of forged or cast metal, as may be most convenient.

What I claim is:—

1. A gardening tool comprising a pair of relatively narrow, elongated, pivotally connected jaws, trough-shaped in transverse section and meeting at their opposed side edges, together with guide means for preventing relative lateral twisting of said jaws during use.

2. A gardening tool comprising a pair of relatively narrow, elongated jaws merging into enlarged head ends forming a hand hold, and means for pivoting said head ends together.

3. A gardening tool comprising a pair of narrow, elongated jaws merging into enlarged interfitting head ends forming a hand hold, and means for pivoting said head ends together, the latter having coöperating bearing surfaces curved on a radius coaxial with said pivotal joint.

4. A gardening tool comprising a pair of relatively narrow, elongated, trough-shaped jaws with meeting side edges and pivotal connection, together with a stud carried by one jaw and shaped to the inner contour of the other jaw to insure the registry of said jaws when closed.

5. A tool having pivoted jaws and an enlarged head end therefor comprising interfitting head members U-shaped in transverse section, means for pivoting said members together, the latter having bearing surfaces curved on a radius, the center of which is coaxial with said pivotal connection.

6. A gardening tool having a soil entering member comprising a pair of elongated, trough-shaped jaws with meeting side edges and pivoted ends, means for insuring the registry of said jaws in closed position, a pivotal connection at one end thereof, and spring means tending to maintain said jaws open.

In testimony whereof I have signed my name to this specification in the presence of two subscribing witnesses.

JOHN PHILLIPS OLDROYD.

Witnesses:
JOHN THOMAS REMMIR,
RICHARD ERNEST COLCLOUGH.

Copies of this patent may be obtained for five cents each, by addressing the "Commissioner of Patents, Washington, D. C."